United States Patent
Heitz et al.

(10) Patent No.: US 6,262,185 B1
(45) Date of Patent: Jul. 17, 2001

(54) USE OF HIGH-MOLECULAR POLYESTER MOULDING MATERIALS

(75) Inventors: Thomas Heitz, Dannstadt-Schauernheim; Peter Braune, Erbes-Büdesheim; Herbert Fisch, Wachenheim; Erich Pellkofer, Mutterstadt; Georg Schneider, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/529,187

(22) PCT Filed: Oct. 5, 1998

(86) PCT No.: PCT/EP98/06302

§ 371 Date: Apr. 10, 2000

§ 102(e) Date: Apr. 10, 2000

(87) PCT Pub. No.: WO99/20452

PCT Pub. Date: Apr. 29, 1999

(30) Foreign Application Priority Data

Oct. 17, 1997 (DE) .............................. 197 45 921

(51) Int. Cl.$^7$ .............. C08G 63/78; C08K 5/09
(52) U.S. Cl. ............ 525/437; 528/308; 528/308.6; 528/502; 528/503; 428/480; 524/777; 524/779; 524/765
(58) Field of Search ................. 528/275, 308, 528/308.6, 502, 503; 428/480; 524/765, 777, 779

(56) References Cited

U.S. PATENT DOCUMENTS 5,496,887 * 3/1996 Braune .................. 524/777

* cited by examiner

*Primary Examiner*—Samuel A. Acquah
(74) *Attorney, Agent, or Firm*—Keil & Weinkauf

(57) ABSTRACT

The invention relates to the use of thermoplastic polyester molding compounds, containing A) 80 to 100 wt. % of a polyalkylene arylate, especially polybutyleneterephthalate, with a half-width of crystallization heat releases of $\leq 5°$ C. and B) 0 to 20 wt. % of other additives, the weight percentages of constituents A) and B) adding up to 100%, for producing molded bodies by blow-molding, profile extrusion and/or pipe extrusion. A preferred use for the inventive molding compounds is the production of light guide sheathing. The invention also relates to a 3-stage method for producing the polyesters as follows: a) esterification or re-esterification of an aromatic dicarboxylic acid or its derivative and a glycol; b) precondensation; and c) polycondensation to a viscosity number of at least 158 ml/g. The reaction is carried out in at least 2 temperature zones in stages a) and b).

16 Claims, No Drawings

USE OF HIGH-MOLECULAR POLYESTER MOULDING MATERIALS

The present invention relates to the use of thermoplastic polyester molding materials containing
A) from 80 to 100% by weight of a polyalkylene arylate having a half-width of the crystallization isotherms of $\leq 5°$ C.
B) from 0 to 20% by weight of further additives,
the percentages by weight of components A) and B) summing to 100%,
for the production of moldings by blow molding, profile extrusion and/or tube extrusion.

The present invention furthermore relates to processes for the preparation of the molding materials which can be used according to the invention and the moldings obtainable hereby.

Polyesters are distinguished by low water absorption and good dimensional stability as well as solvent resistance.

Mixtures of polyesters with other additives have long been known. However, the known polyesters can be processed to blown moldings only to a limited extent. Blow molding generally involves extruding a tube of polymer melt, which hangs between the two half-shells of the opened mold. The mold is then closed and the polymer tube is pressed against the mold by internal gas pressure, cooled and removed from the mold.

An important precondition for this processing is that, during extrusion, the polymer tube does not break in the periods when it hangs freely between the molds, so that the shaping process can be completed. It is also desirable that the tube does not sag, since this results in small wall thicknesses in the upper half and larger wall thicknesses in the lower half. Hollow bodies having different wall thicknesses are not suitable for use since the load capacity is generally limited by the point having the smallest wall thickness. The molding materials known from the prior art can therefore be used for the blow molding method only to a very limited extent since the tube strength is too low.

Usually, high molecular weight polyester which are prepared by a batchwise method, for example by polycondensation and subsequent solid-phase postcondensation, as described, for example, in DD-A 138074, DE-A 30 12 692 and DE-A 30 22 076, were used for blow molding.

The disadvantage of these methods are long residence times and an undesirable yellow color of the resulting polyester due to thermal load.

The compounding of high molecular weight polyesters with other additives which, depending on the type and amount, influence the desired properties and the processing of the polyester, is however not possible since a decrease in molecular weight occurs during compounding, so that—even when high molecular weight starting polymers are used—materials unsuitable for blow molding are always formed.

The use of polyesters, in particular polybutylene terephthalate (PBT) for the production of optical waveguide sheaths is disclosed, for example, in DE-A 258 859, DE-A 43 03 116, DE-A 42 12 146, DE-A 42 19 607, DE-A 41 42 047 and EP-A 336 806.

According to JP-A 08/227 030, a PBT suitable for covering optical waveguides has an intrinsic viscosity of 1.2, a terminal carboxyl group content of 40 meq/kg of PBT and nucleating agents, phosphorus compounds and sterically hindered phenols as stabilizers. The difference between melting point and initial crystallization temperature should be >30.

JP-A 08/146 261 describes the addition of polycarbonate and stabilizers to polyesters for improving the performance characteristics.

The polyesters known from the prior art are suitable only to a limited extent for extrusion applications, in particular for optical waveguide (OWG) sheaths.

This is specific, on the one hand to the material, for example PBT has only a moderate tendency to crystallize. On the other hand, the special process conditions in the OWG production give rise to difficulties. The production is carried out by the extrusion method by means of a crosshead (similarly to cable sheathing), in which a cold water bath and also cold gel (interior filling of the tubes) are often used; furthermore, the high take-off speeds have an additional quenching or supercooling effect. The hot melt tube at about 260–270° C. is exposed to a cold gel or water immediately after its emergence from the crosshead (mm or a few cm).

If the polyester does not have a sufficiently high tendency to crystallization, supercooling of the melt occurs in this critical range. Consequently, sufficient crystallization of the melt (and hence the solidification thereof) is suppressed to such an extent that the extrudate is deformed to an oval cross-section by the downstream apparatuses (take-off, etc).

Other consequences of a low tendency to crystallization are, for example, poor mechanical properties, low dimensional stability and insufficient stability to hydrolysis (the latter is however also determined by the level of terminal carboxyl groups).

The following extrudate parameters have a substantial effect on the operability of the optical waveguides:

Extrudate Surface:

Rough uneven surfaces (on the inside) lead to an increase in the damping of the glass fibers and hence to an adverse effect on the transmission quality. A difference in length of the main cross-sectional axes from 0.05 mm, corresponding to <2% of the external diameter, is required.

Concentricity:

Impermissible deviations in the concentricity lead to twisted structures, which are no longer symmetrical and thus limit the capacity of a cable group.

Stability to Hydrolysis:

The tube material must be sufficiently resistant to water or the humid atmosphere so that problem-free installation is possible without the danger of breaking, even after a relatively long time. The after-shrinkage should be <1%.

After-Shrinkage:

If the after-shrinkage is too great, the tube cross-section is reduced so that the glass fibers have less space, the damping increases and the transmission quality suffers.

It is an object of the present invention to provide high molecular weight, readily crystallizing polyester molding materials which can be readily processed continuously and independently of the type of starting materials to give blow moldings, extruded profiles or extruded tubes.

The moldings should have good surfaces and good dimensional stability (accuracy of calibration), stability to hydrolysis and low after-shrinkage.

We have found that this object is achieved, according to the invention, by the use of polyester molding materials as claimed in claim 1. Preferred embodiments and processes for the preparation are described in the subclaims.

The molding materials which may be used according to the invention contain, as component A), from 80 to 100, preferably from 90 to 100, particularly preferably from 50 to 85, % by weight of a thermoplastic polyalkylene arylate.

In general, polyesters based on aromatic dicarboxylic acids and an aliphatic dihydroxy compound are used.

A first group of preferred polyesters comprises polyalkylene terephthalates having 2 to 10 carbon atoms in the alcohol moiety.

Such polyalkylene terephthalates are known per se and are described in the literature. They contain an aromatic ring in the main chain, which ring originates from the aromatic dicarboxylic acid. The aromatic ring may also be substituted, for example by halogen, such as chlorine or bromine, or $C_1$–$C_4$-alkyl, such as methyl, ethyl, isopropyl, n-propyl and n-butyl, isobutyl and tert-butyl.

These polyalkylene terephthalates can be prepared by reacting aromatic dicarboxylic acids, esters thereof or other ester-forming derivatives with aliphatic dihydroxy compounds in a manner known per se.

Examples of preferred dicarboxylic acids are 2,6-naphthalenedicarboxylic acid and terephthalic acid and mixtures thereof. Up to 30, preferably not more than 10, mol % of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, diols of 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol and mixtures thereof are preferred.

Examples of particularly preferred polyester (A) are polyalkylene terephthalates which are derived from alkanediols of 2 to 6 carbon atoms. Among these, polyethylene terephthalate and polybutylene terephthalate and mixtures thereof are particularly preferred.

Particularly preferred polyesters are those whose terminal carboxyl group content is up to 50, preferably up to 30, in particular up to 27, meq/kg of polyester. Such polyesters can be prepared, for example, by a process similar to that of DE-A 44 01 055. The terminal carboxyl group content is usually determined by titration methods (eg. potentiometry).

The viscosity number of the polyester (A) after the continuous melt condensation is at least 158, preferably 168, in particular at least 170, ml/g, measured in a 0.5% strength by weight solution in a phenol/o-dichlorobenzene mixture (weight ratio 1:1) at 25° C. (according to DIN 53728).

The half-width of the crystallization exotherms is understood as meaning in general its width (in ° C.) at half height. The crystallization exotherm is measured by DSC (Differential Scanning Calorimetry) at cooling and heating rates of 20° C./min.

The half-width should be $\leq 5°$ C., preferably $\leq 4.5°$ C., in particular $\leq 4°$ C.

The thermoplastic molding materials which may be used according to the invention may contain, as component B), further additives and processing assistants, such as stabilizers, antioxidants, heat stabilizers and UV stabilizers, lubricants and mold release agents, colorants, such as dyes and pigments, pulverulent fillers and reinforcing agents, nucleating agents, plasticizers, etc, the amount of which is as a rule not more than 20, preferably not more than 10, % by weight.

Examples of antioxidants and heat stabilizers are sterically hindered phenols, hydroquinones, aromatic secondary amines, such as diphenylamines, various substituted members of these groups and mixtures thereof, in concentrations up to 1% by weight, based on the weight of the thermoplastic molding materials.

Examples of UV stabilizers, which in general are used in amounts of up to 2% by weight, based on the molding material, are various substituted resorcinols, salicylates, benzotriazoles and benzophenones.

Furthermore, organic dyes, such as nigrosine, and pigments, such as titanium dioxide, cadmium sulfide, cadmium selenide, phthalocyanines, ultramarine blue and carbon black, may be added as colorants, as well as pulverulent fillers and reinforcing agents. Examples of the latter are minerals, amorphous silica, asbestos, calcium silicate (wollastonite), aluminum silicate, magnesium carbonate, kaolin, chalk, powdered quartz, mica and feldspar. The amount of such fillers and colorants is in general up to 20, preferably up to 10, in particular up to 5% by weight.

Nucleating agents used may be sodium phenylphosphinate, alumina, silica, nylon 22 and preferably talc.

Lubricants and mold release agents, which are usually used in amounts of up to 1% by weight, are preferably long-chain fatty acids (eg. stearic acid or behenic acid), their salts (eg. calcium or zinc stearate) or ester derivatives (eg. stearyl stearate or pentaerythrityl tetrastearate) and amide derivatives (eg. ethylenebisstearylamide), which are preferably used as a mixture with 1,6-hexanediol.

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

The novel molding materials may furthermore contain from 0 to 2% by weight of fluorine-containing ethylene polymers. These are ethylene polymers containing from 55 to 76, preferably from 70 to 76, % by weight of fluorine.

Examples of these are polytetrafluoroethylene (PTFE), tetrafluoroethylene/hexafluoroethylene copolymers or tetrafluoroethylene copolymers containing smaller amounts (as a rule up to 50% by weight) of copolymerizable ethylenically unsaturated monomers. These are described, for example, by Schildknecht in Vinyl and Related Polymers, Wiley Publishers, 1952, pages 484 to 494, and by Wall in Fluoropolymers (Wiley Interscience, 1972).

These fluorine-containing ethylene polymers are homogeneously distributed in the molding materials and preferably have a particle size $d_{50}$ (number average) of from 0.05 to 10 $\mu$m, in particular from 0.1 to 5 $\mu$m. These small particle sizes can be particularly preferably obtained by using aqueous dispersions of fluorine-containing ethylene polymers and incorporating them into a polyester melt.

For better compatibility with the thermoplastic polyester, minerals and fillers are, if required, treated with a compatibilizer. Glycidyl-, vinyl- and aminoalkyltrialkoxysilanes are preferred.

Examples of preferred additives for improving the surface are polycarbodiimides (PCDI), in particular those of the general formula:

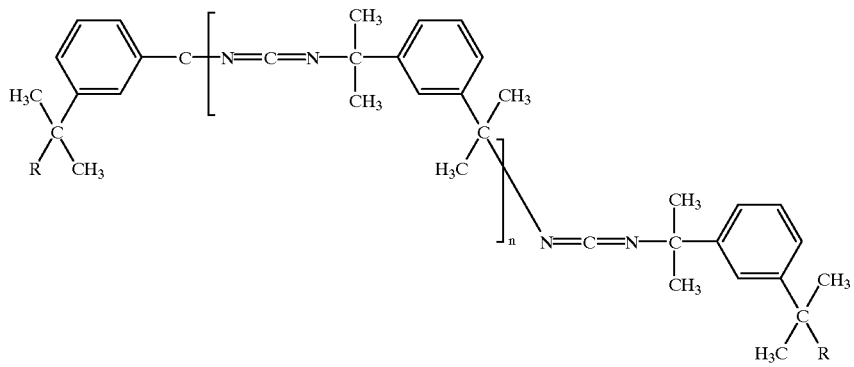

where
R are identical or different and are selected from the group consisting of the —NCO—, —NHCONHR$^1$—, —NHCONR$^1$R$^2$—and —NHCOOR$^3$—radicals,
R$^1$ and R$^2$ are identical or different and are each alkyl, cycloalkyl or aralkyl,
R$^3$ is R$^1$ or an alkoxypolyoxyalkylene radical and
n is an integer from 0 to 10.

Such PCDIs and processes for their preparation are described, inter alia, in WO-A 96/17011. The PCDIs are present in the polyester molding materials in an amount of up to 3, preferably up to 2, % by weight.

The polyester molding materials which may be used according to the invention are prepared continuously by a method in which a) in a first stage, an aromatic dicarboxylic acid or an ester or ester-forming derivative thereof is esterified or transesterified with a molar excess of a dihydroxy compound, b) in a second stage, the transesterification or esterification product obtained according to a) is subjected to precondensation and c) in a third stage, the product obtainable from b) is subjected to polycondensation to a viscosity number (VN) of at least 158 ml/g, stage a) and stage b) of the process being carried out in at least two temperature zones and, if required, component(s) B being added before or after the polycondensation c).

Stage a) of the process is referred to as a transesterification or esterification reaction. This is carried out in at least two, preferably at least three, temperature zones. The temperature of the subsequent zone should be 1–40° C., preferably 2–30° C., in particular 5–10° C., higher than the temperature of the preceding zone. The temperature range for the entire esterification reaction is in general (depending on the starting material) from 165 to 260° C., preferably from 170 to 250° C., in particular from 180 to 240° C., and the pressure is in general from 1 to 10, preferably from 1 to 4, in particular from 1 to 2, bar.

Stage a) of the process is preferably carried out in at least two temperature zones with very substantially the same pressure conditions in the individual zones. The technical preconditions, such as apparatuses (for example in the form of kettle cascades), for providing different temperature zones are known to those skilled in the art, and further details in this respect are therefore superfluous.

The starting materials, such as diols and acids, were described above (component A).

Usually, a molar excess of diol is used for the reaction, in order to influence the ester equilibrium in the desired form. The molar ratios of dicarboxylic acid or dicarboxylic ester-: diol are usually from 1:1.1 to 1:3.5, preferably from 1:1.2 to 1:2.2. Molar ratios of dicarboxylic acid:diol of from 1:1.5 to 1:2 and of diester:diol of from 1:1.25 to 1:1.5 are very particularly preferred.

However, it is also possible to carry out the ester reaction with a smaller excess of diol in the first zone and accordingly to add further amounts of diol in the further temperature zones. In the preferred embodiment of the novel process comprising three temperature zones, the total amount of diol is divided into the following percentages among the 3 zones: from 60 to 85 (1), from 10 to 25 (2) and from 5 to 15 (3), preferably from 70 to 80 (1), from 10 to 20 (2) and from 5 to 10 (3).

The residence times for the total stage a) are from 140 to 300, preferably from 150 to 260, in particular from 160 to 220, minutes; the residence time for the first zone is from 100 to 190, preferably from 110 to 150, minutes; that for the second zone is from 65 to 140, preferably from 65 to 110, minutes. For the preferred embodiment comprising 3 zones, the residence time in the 3rd zone is from 15 to 45, preferably from 15 to 30, minutes, the residence times in the 2nd zone being correspondingly shorter and those in the 1st zone being retained as mentioned above.

In the preferred embodiment of the novel process, the residence times decrease from the first zone to the third zone in the ratio of, preferably, 6:3:1.

In a particularly preferred embodiment, first a catalyst and then an alkali metal compound or alkaline earth metal compound are added to the dihydroxy compound before stage a) of the process.

Preferred catalysts are titanium compounds and tin compounds as disclosed, inter alia, in U.S. Pat. Nos. 3,936,421 and 4,329,444. Examples of preferred compounds are tetrabutyl orthotitanate and triisopropyl titanate and tin dioctanoate, which are usually used in stage a) in amounts of from 20 to 150 ppm, preferably from 20 to 120 ppm, in particular from 30 to 70 ppm (based on the metal).

For further reduction of the terminal carboxyl group content of the polyester, it may be advantageous to add from 0.1 to 10, preferably from 0.2 to 0.65, mmol, per kg of polyester, of an alkali metal compound or alkaline earth metal compound (calculated as alkali metal and alkaline earth metal, respectively) before the reaction of the starting monomers. Such compounds are proposed in DE-A 43 33 930. Examples of preferred compounds are sodium carbonate, sodium acetate and sodium alcoholates, in particular sodium methylate.

The transesterification or esterification products are then transferred continuously to the precondensation stage b).

This has at least two, preferably at least three, in particular at least four, temperature zones. Here, the temperature of the subsequent zone is from 1 to 40° C., preferably from 2 to 30° C., in particular from 5 to 20° C., higher than the temperature of the preceding zone. The temperature range for the entire precondensation is in general (depending on starting materials) from 220 to 300° C., preferably from 225 to 290° C., in particular from 240 to 290° C.

The precondensation is preferably carried out by a procedure in which the pressure is from 0.5 to 1, preferably from 0.6 to 0.8, bar in the first zone and from 20 to 200, preferably from 25 to 150, in particular from 50 to 150, mbar in the second or last zone. For example, a vertical tube-bundle reactor may be used for this purpose, and other reactors for the procedure are known to a person skilled in the art.

The residence times for the entire stage b) of the process are from 10 to 80, preferably from 15 to 50, in particular from 20 to 40, minutes.

In a particularly preferred embodiment of the novel process, four temperature zones are used, the temperature increasing from zone to zone in the ratios described above and the pressure being reduced from the first to the fourth zone within the limits described. In this preferred embodiment of the tube-bundle heat exchanger, the fourth zone consists of an apparatus for separating vapor and liquid phase (also referred to as a vapor separation vessel), the ratio of the volume of the separation vessel to the volume in the tubes being preferably from 5:1 to 15:1, in particular from 8:1 to 13:1.

In this particularly preferred embodiment, the volume ratios of the first three zones are such that the first zone accounts proportionately for from 30 to 60%, preferably 50%, the second zone for from 20 to 40%, preferably 30%, and the third zone for from 10 to 30%, preferably 20%, of the volume (volume ratios). The temperature ranges, pressure ranges and residence times for the particularly preferred embodiment of the novel process are stated below:

1st Zone:
Temperature of from 230 to 270° C., preferably from 240 to 250° C., pressure of from 0.6 to 0.9, preferably from 0.7 to 0.9, bar.
Residence time of from 10 to 30, preferably from 15 to 25, minutes.

2nd Zone:
Temperature of from 240 to 280° C., preferably from 250 to 270° C., pressure of from 0.2 to 0.6, preferably from 0.3 to 0.5, bar.
Residence time of from 5 to 25, preferably from 7 to 15, minutes.

3rd Zone:
Temperature of from 245 to 290° C., preferably from 250 to 280° C., pressure of from 0.1 to 0.3, preferably from 0.1 to 0.25, bar.
Residence time of from 5 to 10, preferably from 4 to 8, minutes.

4th Zone:
Temperature of from 250 to 300° C., preferably from 252 to 285° C., pressure of from 0.015 to 0.2, preferably from 0.025 to 0.15, bar.
Residence time of from 10 to 30, preferably from 14 to 24, minutes.

The catalysts and further additives stated above for stage a) of the process can be metered in the stated amounts into stage b) of the process.

After stage b) of the novel process, the polyester prepolymer has a viscosity number of from 15 to 50, preferably from 20 to 30, ml/g, measured as 0.5% by weight solution in 1:1 phenol/o-dichlorobenzene according to DIN 53728, Part 3 (1985) at 25° C.

The polyester prepolymer is then transferred to stage c) of the novel process. This is preferably carried out in one step at from 240 to 290° C., preferably from 240 to 270° C., in particular from 240 to 265° C. The pressure is from 0.3 to 10, preferably from 0.3 to 5, in particular from 0.3 to 2, mbar.

The residence times are usually from 30 to 180, preferably from 35 to 150, minutes.

During the polycondensation, regeneration of the surface of the product can preferably be carried out. Surface regeneration means that further polymer constantly reaches the surface of the melt, facilitating the exit of the diol.

This is preferably from 1 to 20, in particular from 1.5 to 6, $m^2$ per kg of product per minute.

In this stage of the process too, it may furthermore be advantageous to add catalysts and other additives, as described above.

The product is then devolatilized by means of conventional apparatuses, extruded, cooled and converted into granules.

After the continuous polycondensation, the polyester has a viscosity number of at least 158, preferably 168, ml/g, determined in a 0.5% strength by weight solution in a phenol/o-dichlorobenzene mixture (weight ratio 1:1 at 25° C.) according to DIN 53728, 3rd Part (1985).

The high molecular weight polyesters obtainable by the process described above have a high tendency to crystallization.

They are therefore suitable for the production of blown moldings, extruded profiles and extruded tubes of all kinds, in particular for cable sheaths and optical waveguide sheaths. The moldings have good mechanical properties, good dimensional stability and stability to hydrolysis in addition to a good surface and little back-shrinkage.

EXAMPLES

Example 1

Stage a)

881.8 g of dimethyl terephthalate (DMT) and 563.7 g of 1,4-butanediol (BD) were fed per hour into a stirred reactor in a continuous manner. First 781.8 mg of tetrabutyl orthotitanite and then 99 μl of a 30% by weight solution of $NaOCH_3$ in methanol were mixed with the butanediol continuously before contact with the DMT.

The temperature in the first reaction zone was 185° C. at 1 bar and with an average residence time of 184 minutes.

The temperature in the second reaction zone was 205° C. at 1 bar and with an average residence time of 65 minutes.

The temperature in the third reaction zone was 210° C. at 1 bar and with an average residence time of 41 minutes.

The distillates obtained here were separated in a column system, DMT and BD being recycled into the reaction.

Stage b)

With a conversion of 94%, the transesterification product was fed to a vertical tube which was divided into 4 heating zones.

The temperature in the first reaction zone was 245° C. at 700 mbar and with an average residence time of 22 minutes.

The temperature in the second reaction zone was 250° C. at 400 mbar and with an average residence time of 12 minutes.

The temperature in the third reaction zone was 255° C. at 150 mbar and with an average residence time of 6 minutes.

The temperature in the fourth reaction zone was 255° C. at 50 mbar and with an average residence time of 18 minutes.

The excess BD and the reaction products, such as tetrahydrofuran and water, were separated off at the upper end of the reaction tube and were worked up.

Stage c)

The precondensate was transferred to a polycondensation reactor, without further addition of catalysts.

The temperature in the reaction zone was 255° C. at 0.5 mbar and with an average residence time of 115 minutes.

The product obtained had a VN of 164 ml/g and a terminal carboxyl group content (TCC) of 23 meq/kg, a yellowness of ΔB 1.9 against a white standard and a half-width of the crystallization exotherm of 3.1° C.

Example 2

The example was carried out similarly to Example 1, but at a temperature in stage c) of 257° C. at 0.5 mbar and with an average residence time of 130 minutes and a surface regeneration of 4 m$^2$/h per kg of PBT. A product having a VN of 169 ml/g and a TCC of 20 meq/kg, a yellowness of ΔB 2.3 against a white standard and a half-width of the crystallization exotherm of 3.1° C. was obtained.

Example 3

The example was carried out similarly to Example 1, but at a temperature in stage c) of 257° C. at 0.5 mbar and with an average residence time of 140 minutes and a surface regeneration of 6.2 m$^2$/h per kg of PBT. A product having a VN of 187 ml/g and a TCC of 23 meq/kg, a yellowness of ΔB 2.5 against a white standard and a half-width of the crystallization exotherm of 3.4° C. was obtained.

Example 4

The experiment was carried out as described in Example 1, 0.5% by weight of a stearate of pentaerythritol being mixed with the melt after the end reactor but before the cooling section.

The product obtained had a VN of 167 ml/g and a TCC of 24 meq/kg, a yellowness of ΔB 2 against a white standard and a half-width of the crystallization exotherm of 3.3° C.

Comparative Example A

The experiment was carried out as described in Example 1, the temperature being 265° C. and the residence time 145 minutes in stage c).

The product obtained had a VN of 142 ml/g, a TCC of 31 meq/kg and a yellowness of ΔB 2.0 against a white standard.

The product was subjected to solid-phase postcondensation at 205° C. under a stream of N$_2$.

The product obtained after the solid-phase condensation had a VN of 160 ml/g, a TCC of 39 meq/kg, a yellowness of ΔB 3.8 against a white standard and a half-width of the crystallization exotherm of 8.7° C.

Comparative Example B

The experiment was carried out as described in Example 1, the temperature in stage c) being 255° C. at 0.8 mbar and with an average residence time of 105 minutes.

The product obtained had a VN of 124 ml/g and a TCC of 24 meq/kg. The product was subjected to condensation at 205° C. under a stream of N$_2$ up to a VN of 176 ml/g. The product obtained after the solid-phase condensation had a TCC of 19 meq/kg, a yellowness of ΔB 3.2 against a white standard and a half-width of the crystallization exotherm of 6.1° C.

The VN was measured at 25° C. in a 0.5% strength solution of the polymer in a 1:1 mixture of phenol/o-dichlorobenzene.

The crystallization was measured by means of DSC after melting once up to 250° C., at a cooling rate of 20° C./min. The half-width was determined as the width of the crystallization peak (in ° C.), measured at half the distance between the base line and the peak maximum.

The terminal carboxyl groups (TCC) were determined by potentiometric titration of the acetic acid liberated on reacting a polymer sample dissolved in nitrobenzene with a defined excess of potassium acetate.

The yellowness ΔB was determined according to DIN 5033, Part 6, against a white standard.

Processing to give extrudates.

The products obtained in Examples 1 to 4 and in Comparative Examples A and B were extruded with an apparatus usually used for the production of optical cables, for example of 45 mm single-screw extruder from Nokia-Maillefer, to give hollow tubes having an internal and an external diameter of 1.9 and 2.5 mm, respectively.

The melt temperature was 260° C.

The maximum possible take-off speed as a measure of the quality of the product for the extrusion application is shown in the table.

The evaluated processing and product parameters were visually assessed:

Concentricity: Measure of the ovalness of the tube cross-section.

After-shrinkage: Decrease in length during storage of unstressed tube sections at 70° C. for 3 minutes.

The stability to hydrolysis was determined by storing extrudates at 85° C. and a relative humidity of 85% over a period of 60 days.

The hydrolysis test is considered to have been passed if the VN measured for the stored extrudate still has a minimum value of >70 ml/g.

The results of the measurements are shown in the table.

TABLE

| Product from example | 1 | 2 | 3 | 4 | A | B |
|---|---|---|---|---|---|---|
| Maximum take-off speed [m/min] | 150–200 | 150–200 | 100–120 | 150–200 | 100* | 100–120 |
| VN of extrudate [ml/g] | 158 | 162 | 177 | 161 | 154 | 166 |
| TCC (meq/kg) in extrudate | 25 | 23 | 25 | 26 | 46 | 29 |
| Half-width of the crystallization peak | 3.1 | 1.3 | 3.1 | 3.3 | 8.7 | 6.1 |
| Extrudate surface | + | + | + | + + | − − | − |
| Concentricity | + + | + + | + + | + + | − | − |

TABLE-continued

| Product from example | 1 | 2 | 3 | 4 | A | B |
|---|---|---|---|---|---|---|
| Stability to hydrolysis | + + | + + | + + | + + | – – | – – |
| After-shrinkage | + + | + + | + + | + + | – – | – |

*Constant extrusion not possible (pump phenomena)

We claim:

1. A thermoplastic polyester molding material containing
   A) from 80 to 100% by weight of a polyalkylene arylate having a half-width of the crystallization isotherms of $\leq 5°$ C.
   B) from 0 to 20% by weight of further additives, the percentages by weight of components A) and B) summing to 100%, produced by a process in which,
   a) in a first stage, an aromatic dicarboxylic acid or an ester or ester-forming derivative thereof is esterified or trans-esterified with a molar excess of a dihydroxy compound, to which first a catalyst and then an alkali metal compound or alkaline earth metal compound has been added,
   b) in a second stage the transesterification or esterification product obtained according to a) is subjected to pre-condensation and
   c) in a third stage, the product obtained from b) is subjected to polycondensation to a VN of at least 158 ml/g, wherein
   stage a) and b) of the process are carried out in at least two temperature zones and, if present, component B) is added to the melt before or after the polycondensation c) and before cooling.

2. The molding material as claimed in claim 1, in which component A) has a terminal carboxyl group content of $\leq 30$ meg/kg.

3. A molding material as defined in claim 1, wherein said alkali metal compound or alkaline earth metal compound is added in amounts of from 0.1 to 10 mmol, calculated as alkali metal compound or alkaline earth metal compound, per kg of polyester.

4. A molding material as claimed in claim 3, wherein stage a) or b) of said process is carried out in at least 3 temperature zones.

5. A molding material as claimed in claim 3, wherein the temperature in stage a) or b) of the subsequent zone is from 1 to 40° C. higher than the temperature of the preceding zone.

6. A molding material as claimed in claim 3, wherein stage a) is carried out under very substantially the same pressure conditions and stage b) under decreasing pressure conditions.

7. A molding material as claimed in claim 3, wherein stage c) is carried out at below 2 mbar.

8. A blow molding, extruded profile or extruded tube produced from the molding material of claim 1.

9. A cable sheath or optical waveguide sheath produced from the molding material of claim 1.

10. A process for producing a thermoplastic polyester molding material containing
    A) from 80 to 100% by weight of a polyalkylene arylate having a half-width of the crystallization isotherms of $\leq 5°$ C.
    B) from 0 to 20% by weight of further additives, the percentages by weight of components A) and B) summing to 100%, in which,
    a) in a first stage, an aromatic dicarboxylic acid or an ester or ester-forming derivative thereof is esterified or trans-esterified with a molar excess of a dihydroxy compound, to which first a catalyst and then an alkali metal compound or alkaline earth metal compound has been added,
    b) in a second stage the transesterification or esterification product obtained according to a) is subjected to pre-condensation and
    c) in a third stage, the product obtained from b) is subjected to polycondensation to a VN of at least 158 ml/g, wherein
    stage a) and b) of the process are carried out in at least two temperature zones and, if present, component B) is added to the melt before or after the polycondensation c) and before cooling.

11. The process as claimed in claim 10, in which component A) has a terminal carboxyl group content of $\leq 30$ meg/kg.

12. The process as claimed in claim 10, wherein said alkali metal compound or alkaline earth metal compound is added in amounts of from 0.1 to 10 mmol, calculated as alkali metal compound or alkaline earth metal compound, per kg of polyester.

13. The process as claimed in claim 10, wherein stage a) or b) of said process is carried out in at least 3 temperature zones.

14. The process as claimed in claim 10, wherein the temperature in stage a) or b) of the subsequent zone is from 1 to 40° C. higher than the temperature of the preceding zone.

15. The process as claimed in claim 10, wherein stage a) is carried out under very substantially the same pressure conditions and stage b) under decreasing pressure conditions.

16. The process as claimed in claim 10, wherein stage c) is carried out at below 2 mbar.

* * * * *